US012699976B2

(12) United States Patent
Shen et al.

(10) Patent No.: US 12,699,976 B2
(45) Date of Patent: Aug. 4, 2026

(54) ROTATABLE MODULE CONNECTOR

(71) Applicant: ZEBRA TECHNOLOGIES CORPORATION, Lincolnshire, IL (US)

(72) Inventors: Mu-Kai Shen, Taipei (TW); Chieh Kai Wang, Taichung (TW); Thomas J. Britts, Coram, NY (US); Kenneth W. Taylor, Toronto (CA); Robert Peri, Etobicoke (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 362 days.

(21) Appl. No.: 17/955,874

(22) Filed: Sep. 29, 2022

(65) Prior Publication Data

US 2024/0112165 A1 Apr. 4, 2024

(51) Int. Cl.
| G06Q 20/00 | (2012.01) |
| G06Q 20/20 | (2012.01) |
| G06Q 20/32 | (2012.01) |

(52) U.S. Cl.
CPC ........... G06Q 20/20 (2013.01); G06Q 20/321 (2020.05); G06Q 20/322 (2013.01)

(58) Field of Classification Search
CPC .... G06Q 20/20; G06Q 20/321; G06Q 20/322; G06Q 20/3278; G06Q 20/34; G06F 1/1632; G07F 7/0873; G07F 7/0886
USPC ........................................................ 705/16
See application file for complete search history.

(56) References Cited

U.S. PATENT DOCUMENTS

| D681,036 | S | | 4/2013 | Taunay da Graca Couto |
| D726,182 | S | | 4/2015 | Durham |
| D822,665 | S | | 7/2018 | Truong |
| D873,910 | S | | 1/2020 | Tsiopanos |
| D884,701 | S | | 5/2020 | Huang |
| D884,702 | S | | 5/2020 | Huang |
| D940,135 | S | | 1/2022 | Lee |
| D971,212 | S | * | 11/2022 | Xu .............................. D14/385 |
| D1,001,093 | S | | 10/2023 | Lim |
| D1,001,122 | S | | 10/2023 | Reber |
| D1,015,330 | S | | 2/2024 | Zhang |
| D1,043,662 | S | | 9/2024 | Shen |
| 2008/0164279 | A1 | * | 7/2008 | Chirnomas ............. G07F 11/04 221/123 |
| 2014/0191034 | A1 | * | 7/2014 | Glanzer ............. G06K 7/10009 235/449 |
| 2019/0228374 | A1 | * | 7/2019 | Hicks .................... G06Q 20/204 |
| 2020/0259300 | A1 | * | 8/2020 | Forutanpour .......... G06Q 20/18 |
| 2020/0379509 | A1 | * | 12/2020 | Coward .................... A47F 9/04 |

FOREIGN PATENT DOCUMENTS

| CN | 111554035 A | * | 8/2020 | ............. H02J 7/0044 |
| WO | WO-03106311 A1 | * | 12/2003 | ........... B65G 47/912 |
| WO | WO-2012005430 A1 | * | 1/2012 | ........... G06F 1/1683 |

* cited by examiner

*Primary Examiner* — Russell S Glass

(57) ABSTRACT

A rotatable connection assembly for a payment module is disclosed herein. The connection comprising a module sled having a module sled connection; a mobile computer mount having a mobile computer connection; a cable between the module sled connection and the mobile computer connection; a rotatable connection assembly disposed between the module sled and the mobile computer mount such that the module sled rotates with respect to the mobile computer mount between a first position and a second position.

11 Claims, 8 Drawing Sheets

108    110    100

102    104    114    112    106    116

ROTATABLE MODULE CONNECTOR

BACKGROUND

Mobile point-of-sale devices are used in retail environments to allow sales associates to move freely while helping customers as needed. These mobile point of sale devices may include a payment module element and a mobile computer element such that the sales associate can look up inventory and process payments for customers.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
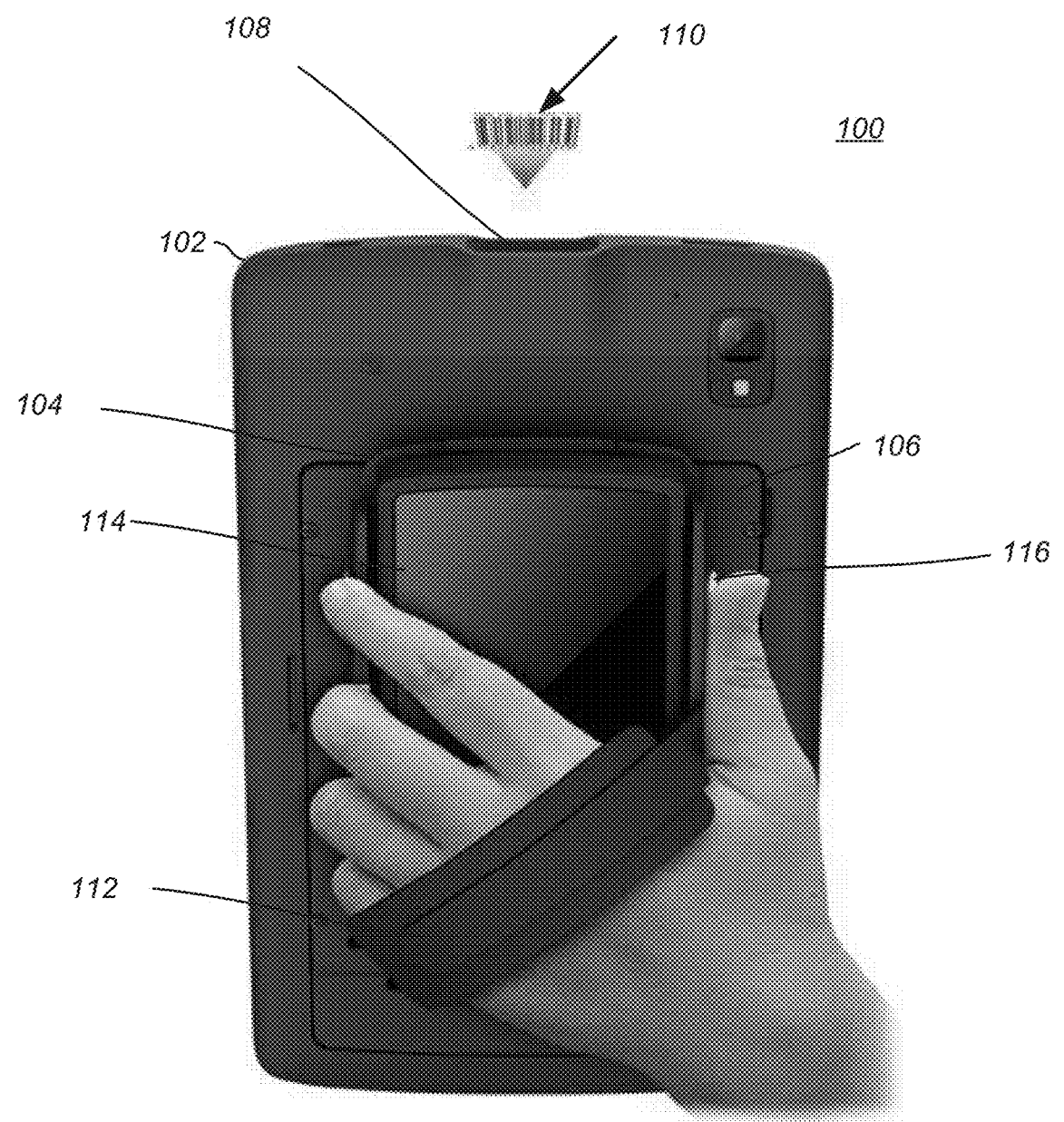
FIG. 1 illustrates an example embodiment of a mobile computer in parallel alignment with a payment module in which systems or methods described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Mobile computers having a payment module mounted on the back can be used in different point of sales environments where a user may need to process data using the mobile computer and have the capability to process payments from customers.

Further allowing a rotatable connection between the mobile computer and the payment module allows for customization by the user to optimize workflow and production. By optimizing the design of the rotatable connection, a cable providing electronic communication between the mobile computer and the payment module can be used while reducing the amount of strain that may come from rotation of the cable.

Examples disclosed herein are directed to a payment module adapter comprising: a module sled having a module sled connection; a mobile computer mount having a mobile computer connection; a cable between the module sled connection and the mobile computer connection; a rotatable connection assembly disposed between the module sled and the mobile computer mount such that the module sled rotates with respect to the mobile computer mount between a first position and a second position.

Further examples disclosed herein are directed to a mobile computer comprising: a mobile computer mount; a module sled rotatably connected to the mobile computer mount; a rotatable connection assembly disposed between the mobile computer mount and the module sled, wherein the rotatable connection assembly is configured to rotate the module sled from a first position to a second position.

FIG. 1 depicts an example embodiment for a mobile computer and payment module combination. As depicted in FIG. 1, a mobile computer 102 is rotatably connected to a module sled 104 containing a payment module 114. The mobile computer 102 is connected to the module sled 104 via a physical cable but cannot be seen in this view. As will be described further below, the mobile computer 102 and the module sled 104 (and payment module 114) are capable of rotating with respect to each other such that they can be aligned parallelly or perpendicularly.

As illustrated in FIG. 1, the mobile computer 102 is a tablet. It is appreciated that the mobile computer 102 can any type of mobile computer capable of connecting with the module sled 104.

As illustrated in FIG. 1, the mobile computer 102 includes a data capture device 108. The data capture device 108 as illustrated is an imager, however the data capture device 108 may also be a laser scanner, barcode scanner, radio frequency identification reader (RFID reader), or any type of functionality that can be triggered to capture data from a product. The captured data could be QR codes, one dimensional barcodes, two dimensional barcodes, or any type of indicia that allows a device to identify a product.

The mobile computer 102 includes a mobile computer mount 106 on the rear of the mobile computer 102. The mobile computer mount can be a battery cover on the rear of the device. The mobile computer mount 106 may be connected using securing devices such as screws or snap in connectors. The mobile computer mount 106 is rotatably connected to the module sled 104 and will be further discussed below.

FIG. 1 further depicts a hand strap 112. In the depicted embodiment, the hand strap is diagonally connected to the module sled 104 from the bottom left side to the upper right side, however it is appreciated that the hand strap 112 may also be connected to the module sled 104 from the upper left to the lower right sides. The hand strap connection method will be discussed in further detail below. The hand strap 112 provides additional support for a user such that the user can actuate trigger buttons 116 on the side of the module sled 114 without the module sled 114 slipping from the users grip.

The trigger buttons 116 are positioned on either side of the module sled 104. The trigger buttons 116 are connected electronically with the mobile computer 102 such that the trigger buttons 116 can initiate operations on the mobile computer 102. The trigger buttons 116 may be configured to initiate an operation if either trigger button 116 is pushed individually or if both sides are pressed in unison. An operation of the mobile computer 102 initiated by the trigger buttons 116 may include activation of the data capture device 108 as described above.

The payment module 114 as depicted in FIG. 1 is securely received by the module sled 104. The payment module 114 operates to receive payment actions by a user of the apparatus 100. In some embodiments, the payment module is designed to receive a payment action in multiple ways. A payment action is a movement by a user to interact a paying accessory (i.e. credit card, debit card, etc.) with the payment module 114. The payment action may be by swiping a magnetic stripe on the back of the paying accessory, dipping a chip from the paying accessory into a slot of the payment module, or by tapping an NFC component against the payment module. When the payment module 114 is installed within the module sled 104, the payment module 114 comes into contact with electrical contacts within the module sled 104. As will be explained further below, the electrical contacts are in connection with the mobile computer 102. The interconnection between the mobile computer 102 and the payment module 114 allow commercial transactions to occur on the mobile computer 102 and the mobile computer to receive payments for the transaction via the payment module 114.

Figure 2:
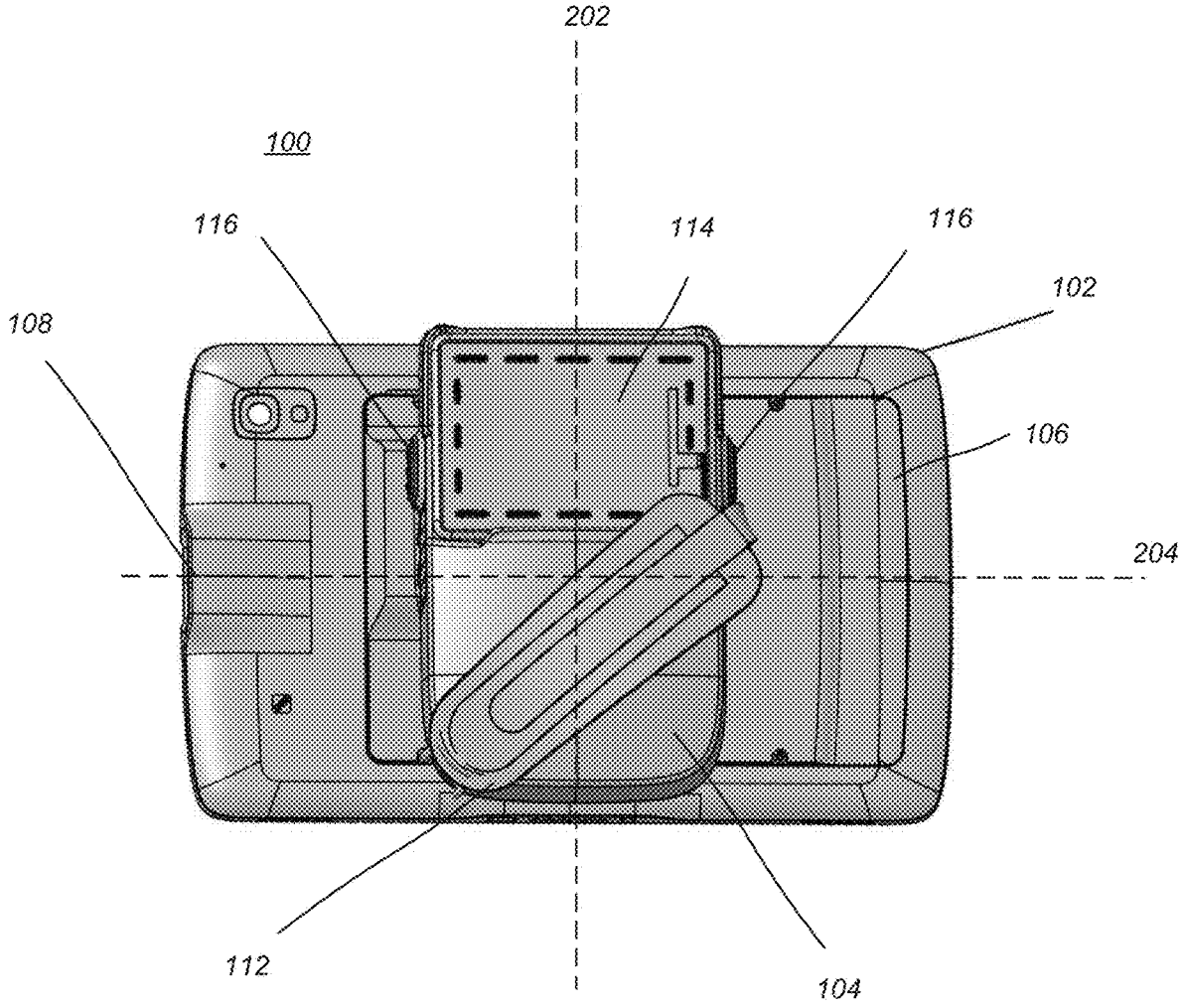
FIG. 2 illustrates an example embodiment of a mobile computer in perpendicular alignment with a payment module in which systems or methods described herein may be implemented.

FIG. 2 depicts the module sled 104 and the mobile computer 102 in perpendicular alignment to each other. As depicted in FIG. 2, dotted line 202 represents a central axis for the module sled 104 and dotted line 204 represents a central axis for the mobile computer 102. FIG. 2 depicts that when the mobile computer 102 and the payment sled 104 are in perpendicular alignment, what is meant is that the central axis 204 for the mobile computer and the central axis 202 for the module sled are perpendicular in relation to the other. As depicted in FIG. 1, the central axis 202 of the module sled 104 and the central axis 204 of the mobile computer 102 are in parallel alignment as the two central axises are parallel to each other.

With regards to the two types of alignments, the data capture device 108 has a field of view (FOV) aligned with the central axis 204 of the mobile computer 102. So as discussed, considering the trigger buttons are on the module sled 104, the user of the apparatus 100 may prefer having the data capture device FOV to the side during operation, as is depicted in FIG. 2, or the user may prefer the data capture device FOV to align with the module sled 104 during operation.

When a user is holding the apparatus 100 and using the apparatus 100 as a point of sale device, the user, based on preferences, may want the mobile computer 102 and the module sled 104 to be in perpendicular alignment or in parallel alignment. This can depend on the view needed on the mobile computer at the time or on how the payment module is position based on design for the user. As noted above, as a trigger button 116 is located on each side of the module sled 104, the user may want to hold the apparatus 100 with either their left or their right hand as desired. The hand strap 112 being able to be repositioned from connection to the module sled 104 from the top left to the bottom right or from the top right to the bottom left (as shown in FIG. 2) is important such that the user can properly support the device when in use.

Figure 3:
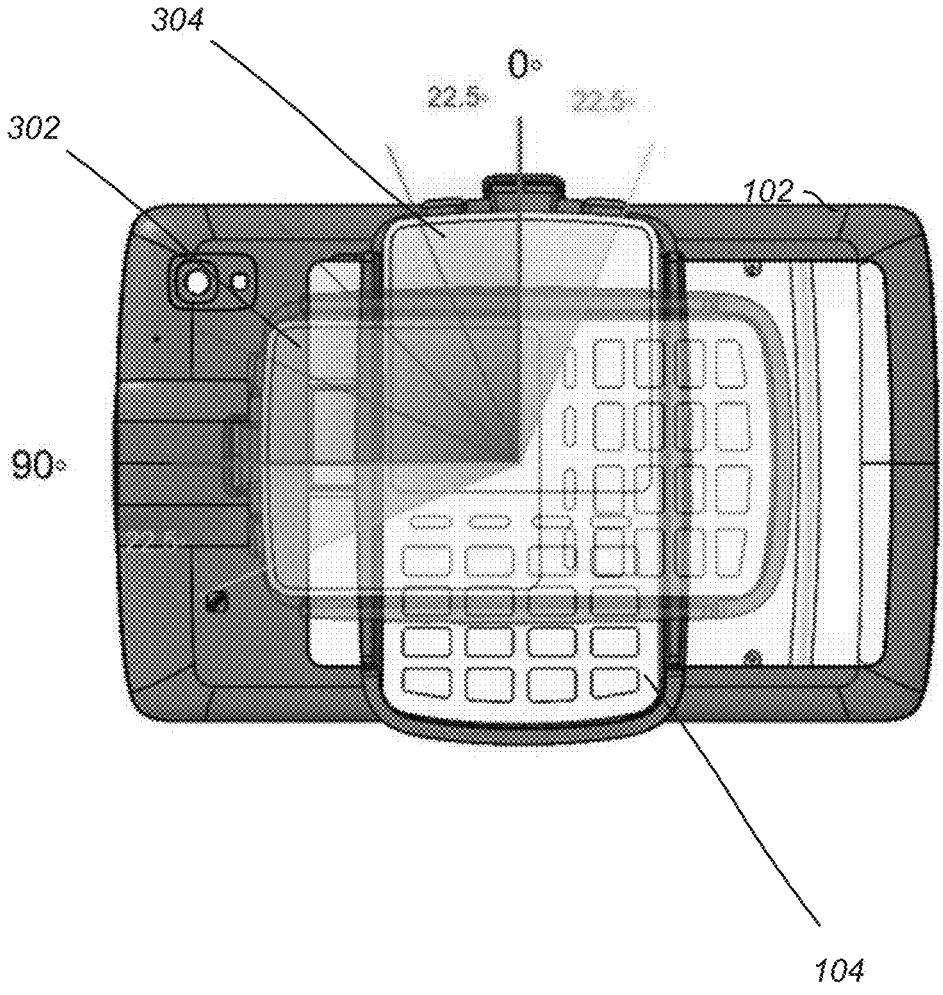
FIG. 3 is a diagram showing angles of orientation between a mobile computer and a payment module moving from parallel alignment to perpendicular alignment for implementing example methods and/or operations described herein.

As depicted in FIG. 3, it can be seen that the central axis 202 of the module sled 104 and the central axis 204 of the mobile computer 106 may be aligned in a multitude of relative angles between being perpendicularly aligned and parallelly aligned. As will be described further below, the relative angles are maintained by a series of detents within the rotational element of the connector. As shown in FIG. 3, while the module sled 104 is designed to rotate 90 degrees with respect to the mobile computer 102, the module sled 104 may also move an additional 22.5 degrees in either rotational direction past the point of either parallel alignment or perpendicular alignment. This provides a total available rotation of 135 degrees while only 90 degrees may typically be used.

Figure 4:
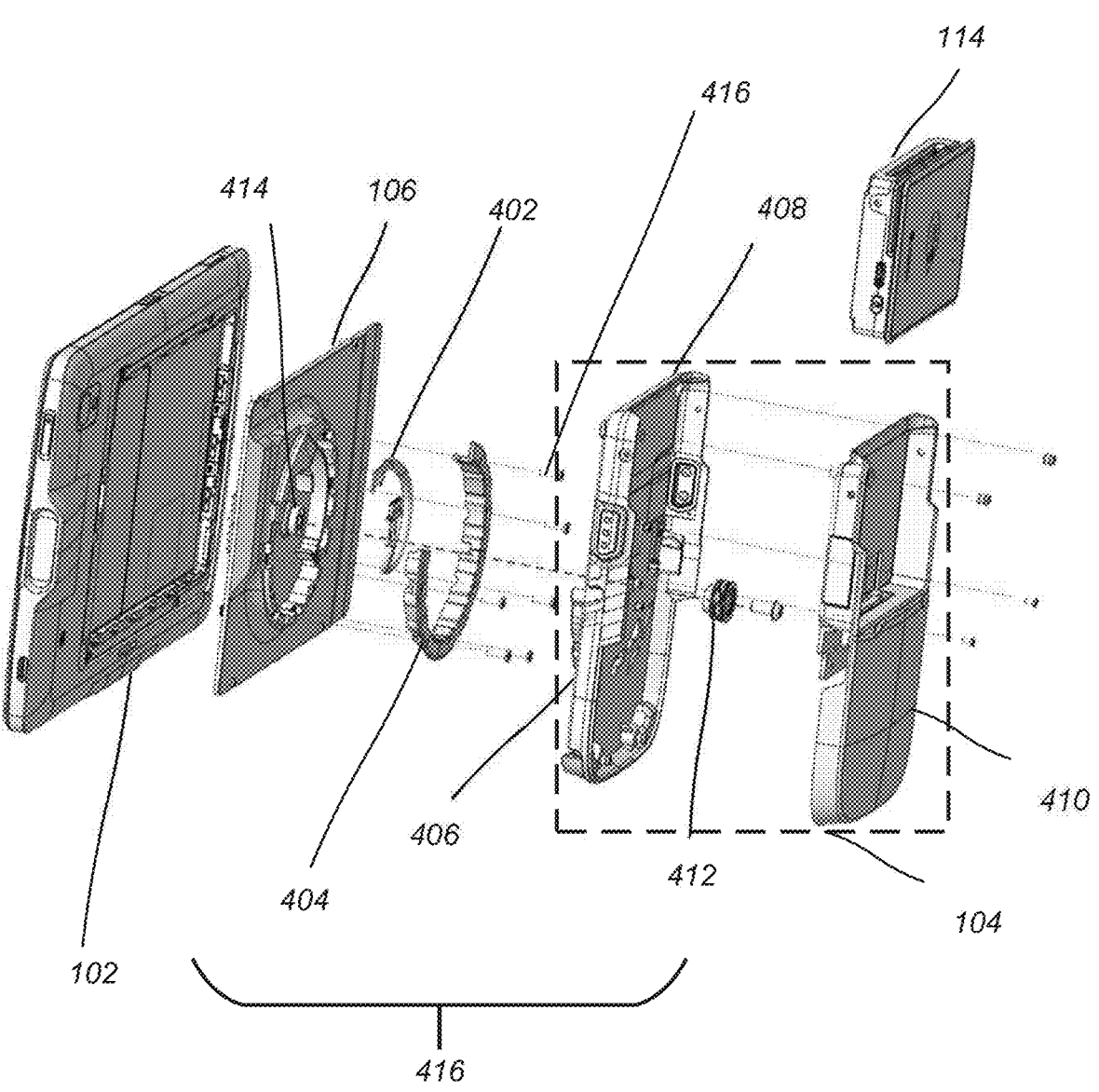
FIG. 4 illustrates an exploded view of the embodiment illustrated in FIG. 2.

FIG. 4 depicts an exploded view of the apparatus 100. The mobile computer 102 supports the mobile computer mount 106 either through a fastener connection of a snap fit connection. The mobile computer mount 106 includes mobile computer detents 404, the mobile computer detents 404 are depicted as connecting to the mobile computer mount 106 with fasteners 416 however the mobile computer detents may also be molded into the mobile computer mount 106. The mobile computer detents 404 are half of a detent set that meshes with the payment module detents 406. As illustrated, the mobile computer detents 404 are female detents and the payment module detents 406 are male detents, but that can be different in other embodiments. The payment module detents 406 are included with a rear housing 408 of the module sled. The rear housing 408 and the payment module detents 406 may be molded into a single element or they may be connected by fasteners. The rear housing 408 and front housing 410 are integrated to form the module sled 104. As mentioned above, the payment module 114 then fits inside the module sled 104.

Figure 5:
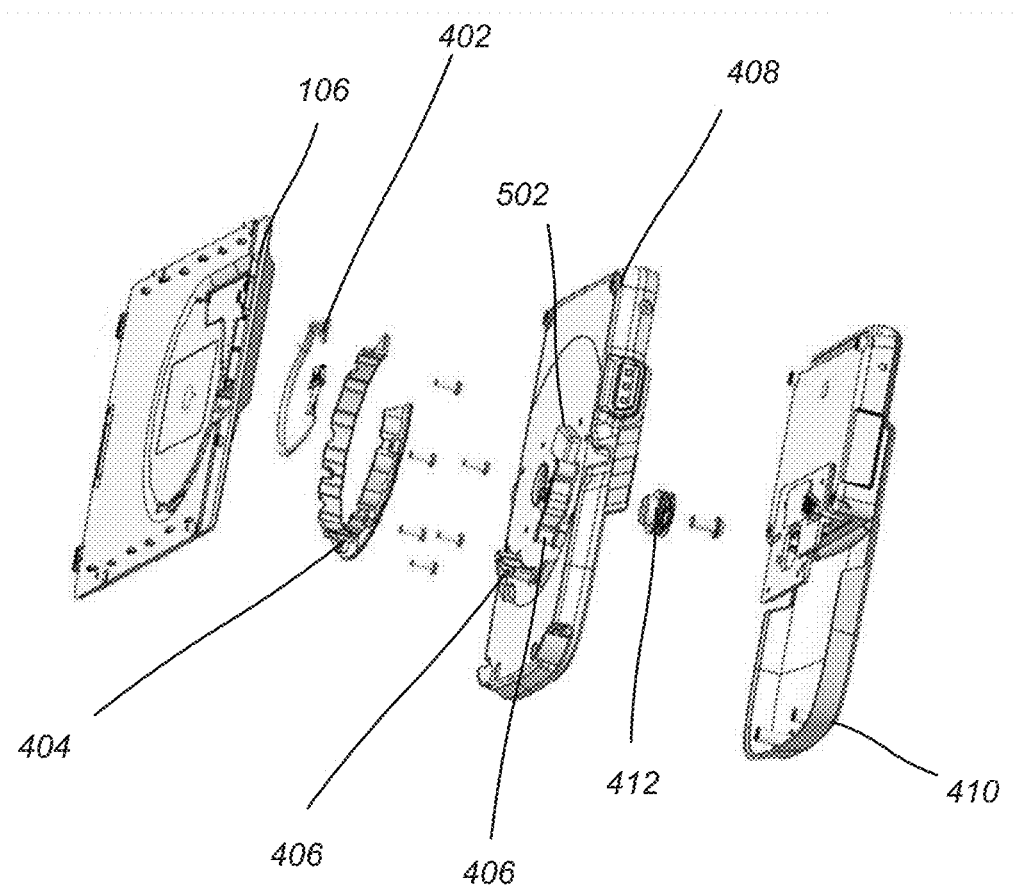
FIG. 5 illustrates the exploded view of FIG. 4 from a different perspective, illustrating an example connection.

FIG. 5 depicts the exploded view of the apparatus 100 from a second perspective. As can been seen in FIG. 5, the payment module detents 406 are located on a rear side of the rear housing 408. The payment module detents 406 mesh within the mobile computer detents 404. As depicted in FIG. 5, the payment module detents are not in a full arc as the mobile computer detents 404 are, rather the payment module detents are shown in a set of two male detents in the depicted embodiment. The illustrated configuration allows the payment module detents 406 to have more freedom of movement within the mobile computer detents 404 as the payment module detents 406 rotate with the module sled 104 as the module sled rotates respectively of the mobile computer 102. In other words, the orientation shown in FIG. 5 is the perpendicular alignment as shown in FIG. 2. As the mobile computer 102 and module sled 104 rotate to the parallel alignment as shown in FIG. 1, the payment module detents 406 rotate against the mobile computer detents 404. When the payment module detents 406 rotate within the mobile computer detents 404, the payment module detents 406 will move in a 90 degree arc along the mobile computer detents 404 as the mobile computer 102 rotates 90 degrees with the module sled 104.

As illustrated in FIG. 4, A pivot connector 412 rotatably connects with a center connector 414. The pivot connector 412 maintains the meshing alignment of the mobile computer detents 404 and the payment module detents 406. The pivot connector 412 allows the module sled 104 and the mobile computer mount 106 to rotate respectively of the other. It is important to note that as the mobile computer mount 106 is fixedly secured to the mobile computer 102, rotation of either element can be inferred to be for all elements.

While the pivot connector 412 allows for rotational movement between the module sled 104 and the mobile computer 102, the detents 404 and 406 are configured to intermesh such that the rotational movement will be locked at multiple relative positions as was shown in FIG. 3.

The rotatable connection assembly 416 between the mobile computer 102 and the module sled 104 is configured to account for a cable connection 402 ("cable 402"). The cable 402 electronically connects the mobile computer 102 to the payment module 114, via the module sled 104. The cable 402 enables data transfer between the mobile computer 102 and the payment module 114 such that payments transactions can occur between the two devices. How the cable 402 is able to interact with the mobile computer 102 and the payment module 114 while not disconnecting during the rotation of the two devices is described in further detail below.

Figure 6:
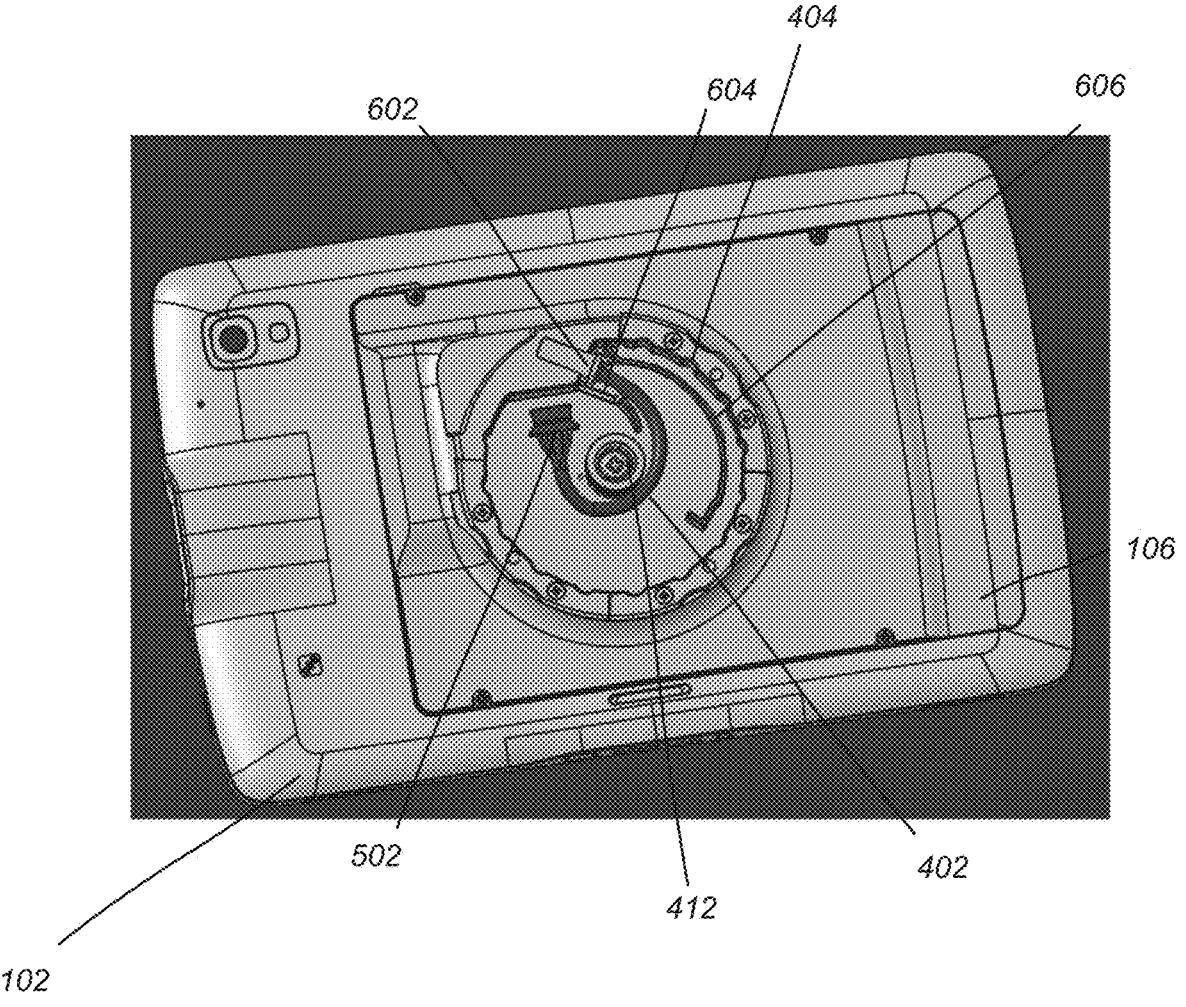
FIG. 6 displays a cable positioning when a mobile computer and a module sled are in a first alignment.

As illustrated in FIG. 5, the cable 402 is connected to the rear housing 408 via the payment module connection 502. The payment module connection 502 is fixed to the rear housing 408 and rotates with the rear housing 408 when the module sled 104 rotates with respect to the mobile computer 102. The payment module connection 502 securely connects with the cable 402 such that the cable 402 does not inadvertently disconnect during rotation of the mobile computer 102 with respect to the module sled 104. As illustrated in FIG. 6, the payment module connection 502 of the cable 402 is located while the rear housing 408 is not explicitly shown.

As illustrated in FIG. 6, the cable 402 is secured to the mobile computer mount 106 via the mobile computer connection 602. The mobile computer connection 602 is fixed to the mobile computer mount 106 and rotates with the mobile computer mount 106 when the module sled 104 rotates with respect to the mobile computer 102. The mobile computer connection 602 securely connects with the cable 402 such that the cable 402 does not inadvertently disconnect during rotation of the mobile computer 102 with respect to the module sled 104.

The illustrated embodiment of FIG. 6 depicts when the mobile computer 102 and the module sled 104 are in perpendicular alignment. During this time, the payment module connection 502 maintains a connection with the module sled 104 (not seen) and rotates with the module sled 104. During the rotation of the mobile computer 102 with respect to the module sled 104, it is imperative that the cable 402 maintains functional integrity and does not suffer extraordinary stress and strain that may cause damage to the cable 402 or cause damage to either the payment module connection 502 or the mobile computer connection 602. By including guide walls into the design of the rotatable connection assembly 416, the cable 402 will not exhibit sharp bends or pressure points during rotation and will suffer less stress.

First wall 604 is positioned within the curvature of the cable 402 as compared to a second wall 606 position on the other side of the cable 402 than the first wall 604. The first wall 604 is configured to cause a slight curve at the location of the mobile computer connection 602 which causes less moment and strain on the mobile computer connection 602 by preventing lateral stresses from bending at the mobile computer connection 602. When the mobile computer 102 and the module sled 104 are in perpendicular alignment, the cable 402 is in a tighter curve around the pivot connector

Figure 7:
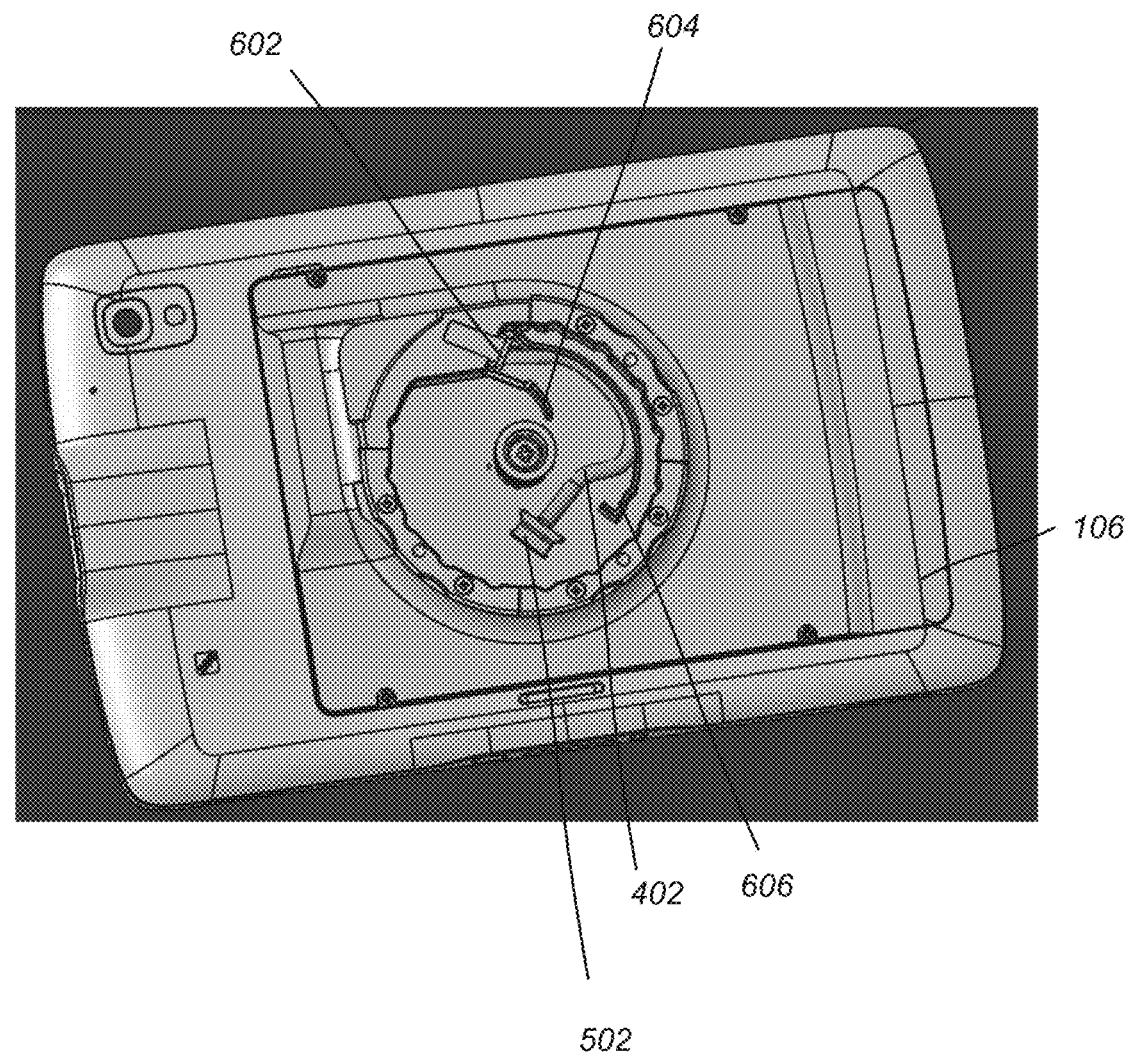
FIG. 7 displays a cable positioning when a mobile computer and a module sled are in a second alignment.

412 in comparison to the cable 402 curve when the mobile computer 102 and the module sled 104 are in parallel alignment (as shown in FIG. 7). The first wall 604 helps ease the burden on the cable 402 by preventing the cable 402 from bending too harshly and causing stress.

The second wall 606, as illustrated by FIG. 7, is position on the other side of the cable 402 from the first wall 604. Whereas the first wall 604 supports the cable 402 to the inside when the mobile computer 102 and the module sled 104 are in perpendicular alignment, the second wall 606 supports the cable 402 to the outside when the mobile computer 102 and the module sled 104 are in parallel alignment. The second wall 606 causes the cable 402 to maintain a slight curvature during the rotation of the devices and helps reduce the stress and strain in the cable and the connections during rotation.

Figure 8:
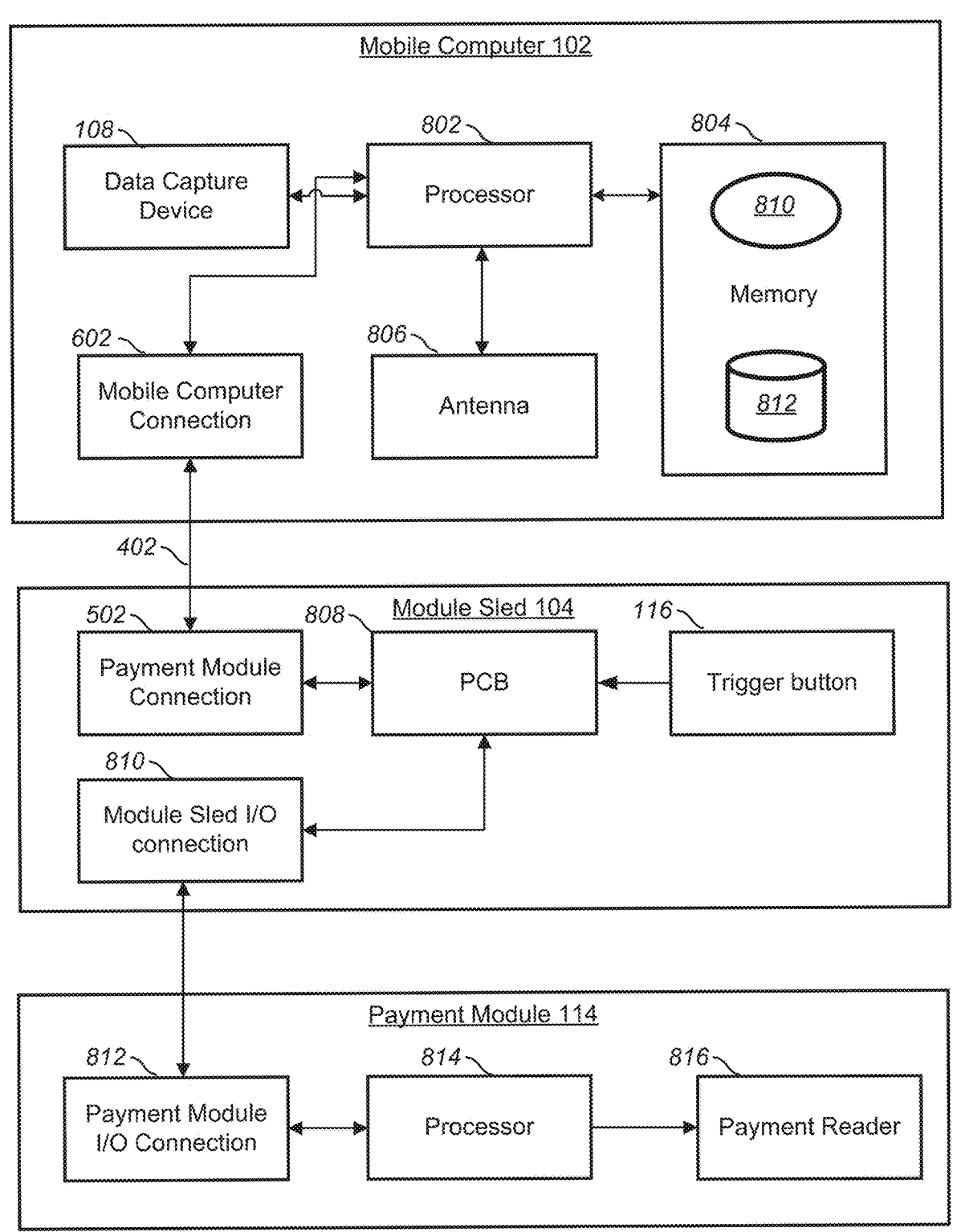
FIG. 8 illustrates example component diagrams the mobile computer, module sled, and the payment module.

As illustrated in FIG. 8, a diagram showing the electrical connections between the mobile computer 102, the module sled 104, and the payment module 114.

The mobile computer 102 includes a data capture device 108 as described above, a processor 802, memory 804, an antenna 806, and a mobile computer connection 602. The processor 802 is any processor known in the art that is configured to operate within a mobile computer 102 during point of sale activities. The processor 802, in one embodiment, is expected to operate point of sales activities with the support of specific programming 810 saved within the memory 804. When a product is scanned by the mobile computer 102 as described above, the input of the product is captured via the data capture device 108 and processed by the processor 802. The processor 802 processes the input by either comparing the input to relevant databases 812 within the memory 804 or by reviewing the input via a wireless server through the antenna connection 806.

The mobile computer 102 is then connected to the module sled 104 via cable 402. The cable 402 is connected to the payment module connection 602 of the module sled 104. The payment module connection 502 is connected to a printed circuit board 808 of the module sled 104. The module sled 104 also includes a button trigger 116 that is also shown in FIG. 1. The button trigger 116, when actuated, sends a signal to the PCB 808 and then to the mobile computer 102 via the cable 402. When the button actuation signal is received by the processor 802, the processor 802 activates the data capture device to capture data.

The payment module 114 is securely received within the module sled 104. The module sled 104 is in communication with the payment module 114 via an I/O connection which includes a module sled I/O connection 810 and a payment module I/O connection 812. The I/O connections 810/812 align into connection when the payment module 114 is properly installed in the module sled 104. The payment module 114 further includes a payment reader 816. As described above, the payment reader 816 is configured to receive payment data from a customer via a payment method, which may include card payments or NFC payments. The payment reader 816 may include a magnetic stripe reader, a card chip reader, a near-field communication reader, or any combination of payment readers. When a payment data signal is inputted to the payment reader 816, the signal is received by the payment module processor 814 and then transmitted via the module sled 104 to the mobile computer 102.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A payment module adapter comprising:
   a module sled having a module sled connection to a portable payment module, wherein the module sled is attached to a hand strap;
   a mobile computer mount having a mobile computer connection to a mobile computer;
   a cable between the module sled connection and the mobile computer connection;
   a rotatable connection assembly disposed between the module sled and the mobile computer mount such that the module sled and the portable payment module rotate with respect to the mobile computer mount between a first position and a second position.

2. The adapter of claim 1, wherein the cable provides communication between the portable payment module and the mobile computer.

3. The adapter of claim 1, wherein the mobile computer mount is attached to the mobile computer.

4. The adapter of claim 3, wherein the mobile computer is a tablet.

5. The adapter of claim 3, wherein the mobile computer comprises a data capture device.

6. The adapter of claim 5, wherein the module sled comprises a trigger button configured to initiate a capture action via the data capture device.

7. The adapter of claim 1, wherein the module sled is configured to receive the portable payment module.

8. The adapter of claim 7 wherein the portable payment module accepts a payment method via at least two payment areas.

9. The adapter of claim 1, wherein the rotatable connection further comprises detents to maintain a position of rotation of the module sled with respect to the mobile computer mount.

10. The adapter of claim 1, further comprising:
   mobile computer detents secured to the mobile computer mount;
   payment module detents secured to a rear housing of the module sled; and
   a pivot connector connecting the rear housing to the mobile computer mount such that the mobile computer detents interact with the payment module detents.

11. The adapter of claim 2, wherein the module sled is configured to receive the portable payment module.

* * * * *